Nov. 28, 1944. W. S. MILES ET AL Re. 22,571

BUILDING CONSTRUCTION

Original Filed Feb. 19, 1942

INVENTOR.
WILLIAM S. MILES
PAUL A. VOIGT.
BY Virgil C. Kline
ATTORNEY

Reissued Nov. 28, 1944

Re. 22,571

UNITED STATES PATENT OFFICE 22,571

BUILDING CONSTRUCTION

William S. Miles, Hastings on Hudson, and Paul A. Voigt, Bellerose, N. Y., assignors to Johns-Manville Corporation, New York, N. Y., a corporation of New York Original No. 2,351,993, dated June 20, 1944, Serial No. 431,518, February 19, 1942. Application for reissue September 2, 1944, Serial No. 552,464

2 Claims. (Cl. 108—9)

The instant invention relates to a shingled construction, and, more particularly, to improvements in a method and means for securing overlapping shingle portions.

The invention may be employed with rigid or semi-rigid shingles or other covering units of various types, but for the purposes of explanation will be described in conjunction with asbestos-cement shingles, that is, shingles composed of a hardened, highly compressed and densified composition of asbestos fibre and Portland or other suitable cement. The invention is particularly applicable to shingles of this type which have a free edge or end to be secured to an underlying shingle. Heretofore, shingles of the type referred to, particularly, shingles laid in hexagonal pattern or those laid by the Dutch lap method, have had their free edges or corners fastened to the underlying shingle, for example, as by means of the clip illustrated in patent to Rowe No. 2,015,020, issued September 17, 1935, or an anchoring device as illustrated in patent to Black No. 1,775,085, issued September 9, 1930. Such clips or anchoring means are conventionally formed of copper or the like and fit relatively loosely in preformed perforations provided for their reception. The end of the anchoring means or clip, as the case may be, is bent over onto the upper or under face of the shingle to provide the holding action. Although such devices have proved generally satisfactory, they have necessarily required the use of copper, or a similar, relatively expensive, strategic metal, and furthermore, have not provided the weather tightness desired.

A principal object of the instant invention is the provision of a roof or siding construction including overlapping weather facing elements, having improved means of securement for the free ends of the elements.

Another object of the invention is the provision of an improved construction of the type referred to, employing fastening elements of relatively soft metals, such as lead and the like.

A further object of the invention is the provision of a roof or wall construction, or the like, including overlapping shingles in which exposed securing means are employed of a type to provide a more weather tight construction than heretofore obtainable.

A still further object of the invention is the provision of an improved method of laying the shingles or the like.

Our invention will be more fully understood and further objects and advantages thereof will become apparent when reference is made to the more detailed description thereof which is to follow and to the accompanying drawing, in which.

Figure 1:
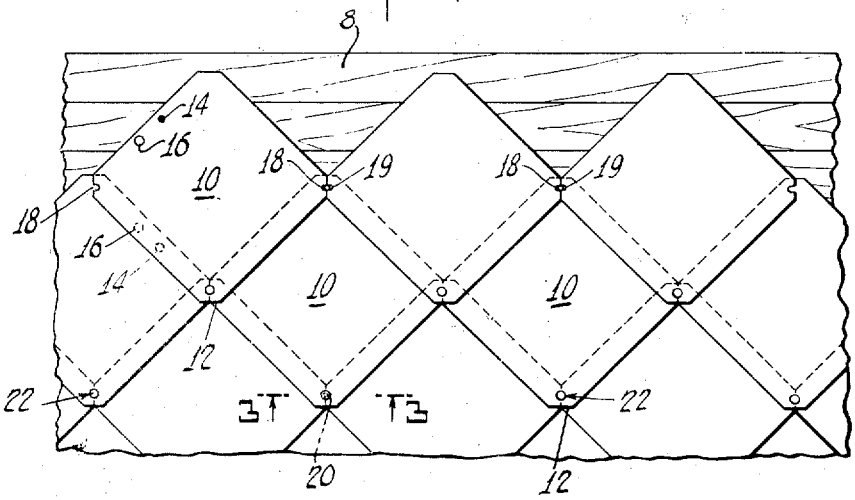
Fig. 1 is a perspective view of partial shingle courses laid in accordance with the instant invention.

Referring now to the drawing, and particularly to Fig. 1, there is disclosed a partial roof or side wall, including a deck 8 formed of wooden sheathing or the like and covered with suitable weather facing elements 10, which, in this instance, have been shown as comprising shingles laid in hexagonal pattern. As previously stated, however, the invention is equally applicable to constructions employing the Dutch lap method or other constructions where a free end or edge of a shingle or other covering element is secured to an underlying element. The shingles are preferably formed of a hardened, compressed, asbestos-cement composition. However, other kinds of shingles may be used.

In accordance with conventional practice, the shingles 10 include a truncated nose 12 forming a free edge, and which is laid to overlie adjacent corners of the shingles of a course therebelow. When the shingles are laid up, a hexagonal shingled appearance is given to the roof. The shingles may include preformed perforations 14 in the headlap portions underlying an overlapping course of shingles, the perforations receiving nails or other securing means 16, which are driven therethrough and into the roof deck (see Fig. 2).

Adjacent corners of the shingles of each course are provided with notches 18, or otherwise formed to receive the shanks of fastening elements employed to secure the free corners of the overlying shingles. The free edge or corner of each shingle is likewise provided with a perforation 20 which, when the shingles are laid up as illustrated in Figs. 1 to 3, overlies the perforations 19 formed by the notches 18 in the underlying course of shingles.

Figure 2:
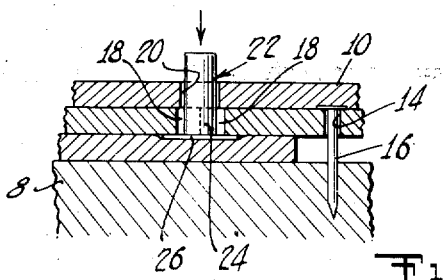
Fig. 2 is a detail sectional view on an enlarged scale taken on the line 2—2 of Fig. 1.
Figure 3:
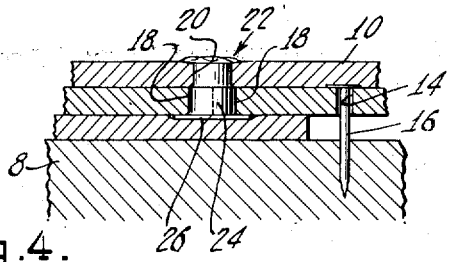
Fig. 3 is a detail sectional view similar to Fig. 2, illustrating one stage in the shingle laying operation.
Figure 4:
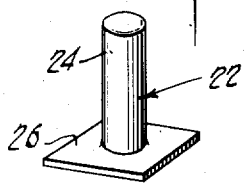
Fig. 4 is a perspective view on an enlarged scale of a fastening device employed in the instant invention.

In accordance with the invention, a fastening element or anchoring device 22 is employed (see Fig. 4), such element including a shank 24 extending through the aligned perforations 19 and 20 and projecting therebeyond and a head 26 resting on the roof deck or preferably on the upper end of a shingle of an underlying course, as illustrated, for example, in Figs. 2 and 3. Fastener 22, in accordance with the invention, is formed of a relatively soft, malleable material, such, for example, as lead or the like. The shank 24 is preferably of a diameter to fit relatively snugly within at least the perforation 20.

In laying shingles in accordance with the invention, fasteners 22 are slipped into the openings 19 formed by the adjacent notches 18 of shingles in one course. Shingles of an overlying course are then laid with the extending shank of the fastener projecting through their perforations 20 (see Fig. 2), and the shingles are secured as by nails 16 driven through perforations 14. The free ends of the shingles are then fastened to the underlying shingles by peening or riveting over the projecting shanks of the fasteners 22 with relatively light taps of a hammer or the like. The riveting operation brings the overlapping shingles into close engagement with the underlying shingles and secures them permanently in such position. Also, the riveting operation, due to the malleable character of the material of which the fasteners are composed, swedges out the shanks of the fasteners sufficiently to cause them to fit tightly within the perforations and seal them against the entry of moisture, which might otherwise penetrate to the roof deck therebelow (see Fig. 2). The close contact between the fastener shanks and the walls of the perforations, after the fasteners have been riveted, also increases the holding action of the fasteners. The fastener has the further advantage that, due to its gray color, it blends with the normal color of the asbestos-cement shingles and is practically invisible from even a short distance.

As previously stated, although the invention has been described specifically in connection with securing the free ends or edges of overlapping asbestos-cement units or the like, it will be understood that it may be employed in any circumstances where similar securing problems are met. Also, having thus described the invention in rather full detail, it will be understood that these details need not be strictly adhered to, but that various changes and modifications will suggest themselves to one skilled in the art, all falling within the scope of the invention as defined by the subjoined claims.

What we claim is:

1. A construction comprising a plurality of relatively frangible covering elements including overlapping portions, aligned perforations in said overlapping portions, and a rivet of relatively soft metal of substantially the malleable characteristics of lead having a shank extending through said aligned perforations and substantially filling the same and heads lying on opposite faces of said overlapping portions, said overlapping portions being held in tight engagement by said heads and shanks.

2. A construction comprising a plurality of hardened, compressed, asbestos-cement covering elements including overlapping portions, preformed aligned perforations in said overlapping portions, and a lead rivet including a shank extending through said aligned perforations and heads lying on opposite faces of said overlapping portions, said overlapping portions being held in tight engagement by said heads and shank, said shank substantially filling said perforations and sealing the same against the entry of moisture or the like.

WILLIAM S. MILES.
PAUL A. VOIGT.